P. G. GARDINER.
Car Spring.
No. 92,183. Patented July 6, 1869.
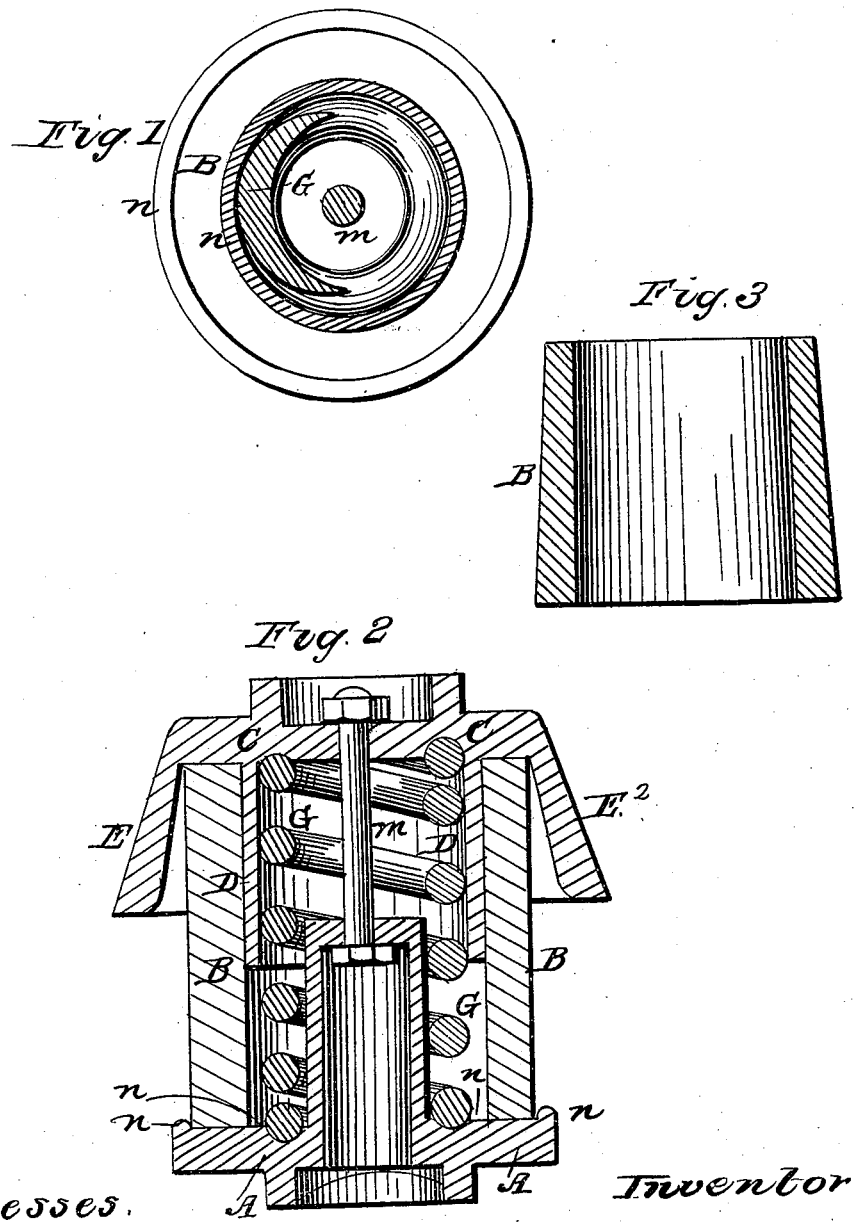

United States Patent Office.

PERRY G. GARDINER, OF NEW YORK, N. Y.

Letters Patent No. 92,183, dated July 6, 1869.

IMPROVED RAILWAY-CAR SPRING.

The Schedule referred to in these Letters Patent and making part of the same.

*To all whom it may concern:*

Be it known that I, PERRY G. GARDINER, of New York, in the county and State of New York, have invented a new and useful Improvement in "Car-Springs;" which I call the "Belt Car-Spring;" and I do hereby declare that the following is a full and exact description of the same, reference being had to the accompanying drawings, and to the letters of reference marked thereon.

Figure I represents a horizontal section, and

Figure II, a vertical section of my belt car-spring.

The nature of my invention consists in the arrangement of an India-rubber ring or belt upon a suitable bottom plate, upon which a cover is placed, provided with an inner circular straight ring or flanch, fitting into the inside of the India-rubberring, and with an external, circular, bell-shaped ring, larger in diameter at its smallest part than the outside of the India-rubber ring, in combination with a metal spring placed between the top and bottom plates in the central part.

In the accompanying drawings—

A represents the bottom plate, provided with suitable small projections $n$ $n$, between which an India-rubber ring or belt, B, of the desired height, is placed.

Upon the top of this India-rubber ring or belt B, a cap, C, is placed, provided with a straight cylindrical ring or flanch, D, fitting the inner diameter of the India-rubber belt B, as well as with an outer circular ring or flanch, E, bell-mouthed, and at its smallest diameter a little larger than the outside diameter of the India-rubber ring B, the inclination of which may be more or less, according to the nature of the spring required.

In the inside of the inner ring D, a metal spring G is arranged, between the bottom plate A and cap C, and said plate and cap are connected together by a suitable bolt $m$.

When the load is placed upon the spring, the metal spring G, and the India-rubber ring or belt B, will be compressed simultaneously. The inner ring D, on the cap C, acts as a guide to the inside of the India-rubber ring or belt B when the load on the spring is not very heavy, and prevents any lateral motion or trembling; but as soon as the load increases, the India-rubber belt B will swell and bulge outwards, excepting on either end, coming clear of this inner ring D, and gradually fill the bell-shaped opening or space in the outer ring E, which forms thus a guide for the India-rubber belt, without interfering with the free action of the same, and prevents the bursting or other injury of the India-rubber ring. As soon as the load is diminished, the India-rubber belt will clear the bell-shaped outer ring E, and will act thus without any friction arising either from the inner or from the outer ring fast on the cover C.

Instead of making the India-rubber ring or belt of equal thickness in its whole length, as represented in Figs. I and II, either end may be made thicker than the other end, as represented in Figure III, the increase of thickness being made on the outside, while the inner diameter may be kept straight.

The spring arranged and constructed as above described, is intended for a body or journal-spring; but if the spring is to be used for a buffer or draw-spring, the draw or buffer-bolt is placed through the centre opening in the cap C and bottom plate A, in place of the bolt $m$, and the central metal spring G may be used and arranged around this draw or buffer-bolt, or the same may be dispensed with.

In some cases the central cylindrical ring D may be dispensed with, but I prefer using the same to prevent any lateral motion to the spring, particularly when under a light load.

What I claim as my invention, and desire to secure by Letters Patent, is—

The combination of an India-rubber ring or belt B, with or without an internal metal spring G, the bottom plate A, and cover, C, provided with an external bell-mouthed ring E, and an internal cylindrical ring D, arranged and operating in the manner and for the purpose substantially as described.

P. G. GARDINER.

Witnesses:
HENRY E. ROEDER,
JERRY B. BADGLEY.